United States Patent [19]
Hornyik

[11] Patent Number: 5,274,437
[45] Date of Patent: Dec. 28, 1993

[54] APPARATUS AND PROCEDURE FOR MEASURING THE CROSS-SECTION OF A HOLLOW SPACE

[76] Inventor: Andreas Hornyik, Braitnerstrasse 5, A-2500 Baden, Austria

[21] Appl. No.: 840,894
[22] Filed: Feb. 26, 1992

[30] Foreign Application Priority Data

Feb. 27, 1991 [AT] Austria ................................ 409/91

[51] Int. Cl.⁵ ............................................. G01B 11/00
[52] U.S. Cl. ................................................. 356/376
[58] Field of Search .................. 356/375, 376; 33/338

[56] References Cited

U.S. PATENT DOCUMENTS 4,179,216 12/1979 Theurer et al. ....................... 33/338

FOREIGN PATENT DOCUMENTS 377854 10/1985 Austria .
0078179 10/1982 European Pat. Off. .
946925 8/1956 Fed. Rep. of Germany .
263670 1/1989 Fed. Rep. of Germany .
2094470 9/1982 United Kingdom .

*Primary Examiner*—F. L. Evans
*Attorney, Agent, or Firm*—Cushman, Darby & Cushman

[57] ABSTRACT

The present invention relates to a procedure and a device for measuring a hollow space, preferably a tunnel, using a light-section device arranged on a cart and a video camera directed at this light-section device. A sharply defined profile plane is generated on the tunnel wall using a light plane radiated coplanar to a plate. This profile is recorded by the video camera together with a plum bob, a gauge and a counting device arranged in the area of the front wheel of the cart. By continuous movement of the cart, an uninterrupted image of the tunnel is generated. The position of the individual profiles in the hollow space is ascertained using a reference ray generated by a light source arranged and adjusted in the tunnel, with the reference ray generating a reference point that is constantly recorded by the camera on the plate.

17 Claims, 4 Drawing Sheets

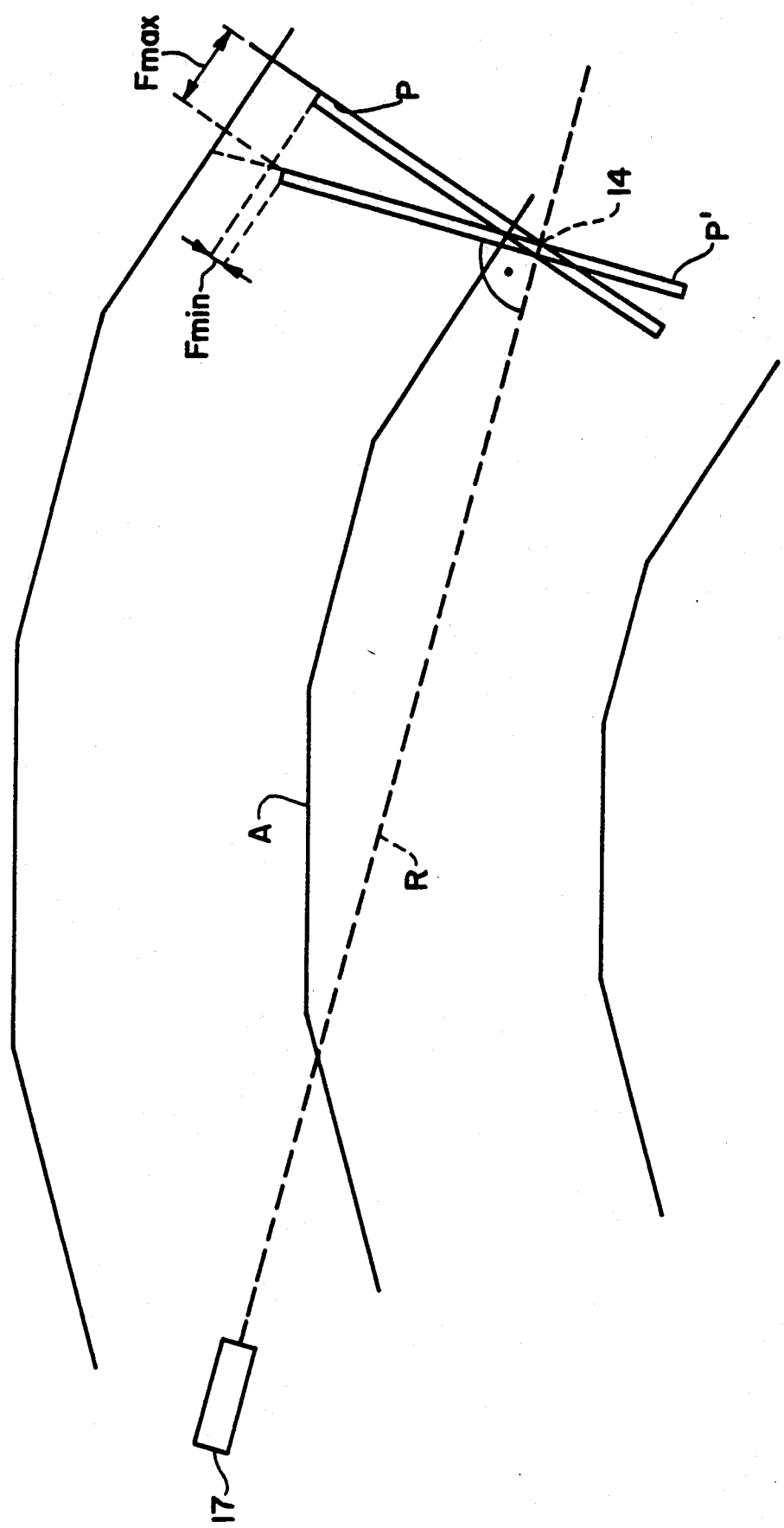

APPARATUS AND PROCEDURE FOR MEASURING THE CROSS-SECTION OF A HOLLOW SPACE

BACKGROUND OF THE INVENTION

1. Field of the Invention

The present invention relates to an apparatus and procedure for measuring the crosssection of a hollow space, such as a tunnel, and, in particular, to a process wherein a light plane is created and pictures are taken of its reflections off of the walls of the hollow space by a camera directed at the light plane and arranged in stationary in relation to the light plane.

2. Description of the Related Art

Procedures exist for measuring hollow spaces, particularly tunnels and tubes. However, these known procedures usually demand massive amounts of work and time, and provide only an incomplete representation of the desired profile of the tunnel. Presently, the profiles can be measured trigonometrically or photogrametrically by a light section method. For example, EP-A1 0 078 179 (European Patent) describes a procedure for photographic profile detection of a tunnel. In this procedure, a light plane is generated using a circular flash arranged in a casing and halogen lamps. The casing has an inner slit opening and an outer slit opening arranged coplanar with one another. The light emerges through these openings. The profile plane thus generated on the walls to be measured is photographed, digitalized and subsequently evaluated at a fairly great expense.

British patent GB-PS 2 094 470 describes another procedure for determining surface profiles of a tunnel. In this procedure, a light ray generated by a laser is projected on the wall to be measured by a rotating mirror or a body with regular angular surfaces. All installations and devices required for the light ray generation are set up on a cart. A camera situated such that its lens axis run parallel to the longitudinal axis of the tunnel takes pictures of the profile plane generated. The path taken by the cart is measured by means of a reference laser working together with reference openings arranged on the cart. A disadvantage of this procedure is the time-consuming adjustments required to be made on the mirror or the angular surfaces and the camera.

German patent DE-PS 946 925 describes still another arrangement for taking pictures of circularly closed inside profiles of a tunnel using a lighting device and a camera that works by the above-described light section method. The lighting device is arranged in a casing, and the punctiform light source is located in the focal point of a circular Fresnel lens. A light fog is generated through this system. The camera takes pictures of the rays of this light fog reflecting from the walls of the tunnel. The lighting device is moved within the tunnel to measure different profiles. However, this causes the profiles to have different scales, and the resulting distortions make the subsequent evaluation more difficult.

East German Patent DD-PS 263 670 also describes a device for producing light sections. The invention uses two plates arranged parallel to and at a short distance from one another, a flash apparatus to generate directed light, and a camera. In addition, a light ray directed parallel to the measuring line is used. Coming from the camera, this ray strikes a mirror provided with a blackened cross, which divides the mirror into 4 parts. When the camera is arranged axially to the light section apparatus, all of the joint faces are lightened uniformly and the flash apparatus arranged between the plates as well as the camera shutter are activated.

All of the aforementioned devices generate a strip of light which in turn generates a circular lighting profile corresponding to the width of the hollow space to be measured. However, individual profiles generated in this manner do not provide any information about the shape and size of a tunnel between the individual profiles. As is generally known, cameras take pictures of the differently created profile planes and the planes can be measured directly on the photo if the scale is known and the image plane is parallel to the profile plane. In principle, however, only individual profiles are determined with the known procedures. Determining the position of the profiles in relation to one another is complicated and time-consuming and is particularly disadvantageous because it requires long work in cramped and unhealthy environments. Furthermore, because the individual profiles must be selected on site, an optimal choice of profiles is impossible in the narrow conduits and tunnels. If the result of the profiles measured proves to be unsatisfactory, additional or different profiles can only be measured at great expense. In addition, irregularities in the shape of the axis and the shape of the conduit or tunnel between the measured profiles are not detected with the known procedures. Good three-dimensional tunnel models require many profiles for the model to be a faithful reproduction, and are, therefore, quite costly. Despite a large number of profiles, damages to the conduit are neither visually documented nor detected with the aforementioned methods.

An object of the present invention is, therefore, to avoid the above-mentioned disadvantages and to provide a procedure and apparatus that makes it possible to achieve a three-dimensional model of the tunnel or the tube, while reducing the time and complexity of the measuring procedure in the tunnel or the tube.

Another object is to provide a method and apparatus that enables pictures of the position and height of the inside space of a tunnel or the like to be continuously taken and documented so that they can be called up at any time to repeat any measurements.

Yet another object of the present invention is to create an uninterrupted digital data flow to avoid errors and accelerate the calculations.

A further object is to enable the individual cross-sections to be measured to be selected at will later, outside of the tunnel.

A still further object of the present invention is to create a model of a tube or tunnel inexpensively and using single measuring procedure.

The present invention achieves these objects by providing a light plane coplanar to a surface. The light plane defines a profile plane of the hollow space and, in addition, illuminates the hollow space extending from the profile plane towards the camera. A reference ray, preferably a laser ray, is used to determine the path of progressing measurements and to provide a reference point on the surface. The distance of the light plane from a predetermined starting point, preferably the source of the reference ray, is constantly measured by a counting device and at preselected intervals by a distance measuring apparatus. Finally, the camera takes pictures of the light plane, the reference point, a plumb bob and the counting device at the same time. In another embodiment of the present invention the camera also takes pictures of a vertical marking arranged in the area of the surface. Yet another feature of the invention is that while the pictures are being taken, the light plane is moved along the longitudinal axis of the hollow space to be measured, and the movement of the light plane along the longitudinal axis of the hollow space to be measured is interrupted at certain time intervals and the position of the light beam is measured in relation to the predetermined starting point.

The present invention also provides a device to carry out the procedure according to the present invention. This device has a light section mechanism composed of at least one plate and at least one light source directed at said plate and a camera directed at the plate. The device of the present invention is simply constructed and inexpensive to operate to measure the cross-section of a hollow space according to the procedure described in the invention.

According to the principles of the present invention, the above objects are accomplished by providing a mechanism in which the plate as well as the camera, preferably a video camera, are arranged on a cart which is movable in the axial direction of the hollow space and a bearing surface and at least one front wheel and one rear wheel. The light source, which is situated in an opening of the plate, is directed at the camera. The light source is covered in a lightproof manner on the plate surface facing away from the camera. A further light source arranged in the tunnel is provided to generate a reference ray aimed at the plate. The plate also has a plumb bob. Finally, a device for measuring the distance covered is arranged on the cart in the area of the plate. The present invention is also characterized in that the helix of the light source is arranged in the plane of a surface of the plate.

According to yet another embodiment of the present apparatus, the bearing surface is a rod structure that firmly connects the camera to the plate. In a further embodiment, the plumb bob is an electronic plumb bob, and a gauge is arranged on the side of the plate facing the camera. According to yet another embodiment, the plate is made of transparent or translucent material.

Further solutions according to the principles of the present invention are characterized in that several light sources directed at the camera are arranged in the plate, the length measuring device is a counting device arranged on the front wheel of the cart, and the cart has a separate counter wheel. The plate can also be arranged on the cart in a tiltable manner by means of a tilting device. This embodiment is particularly advantageous when obstacles protruding from the tunnel wall must be avoided.

The invention may best be understood with reference to the attached drawings, wherein an illustrative embodiment is shown.

BRIEF DESCRIPTION OF THE DRAWINGS

FIG. 6 is a diagram showing the determination of the axis of the cart.

DETAILED DESCRIPTION OF THE PREFERRED EMBODIMENT OF THE PRESENT INVENTION

Referring now to FIGS. 1-4, there is shown therein a movable cart arranged in a tunnel. At the opposite ends of the cart are, on the one hand, a video camera connected firmly to the cart via a mounting 9 and, on the other hand, the plate 1 needed to generate a profile plane. The profile plane is defined by normal light. To be able to evaluate the condition of the conduit, it is not enough to generate a strip of light. A part of the tunnel must also be lighted. The profile plane is thus defined by a clear light-shadow transition from the lighted tunnel section to the unlighted section.

Figure 2:
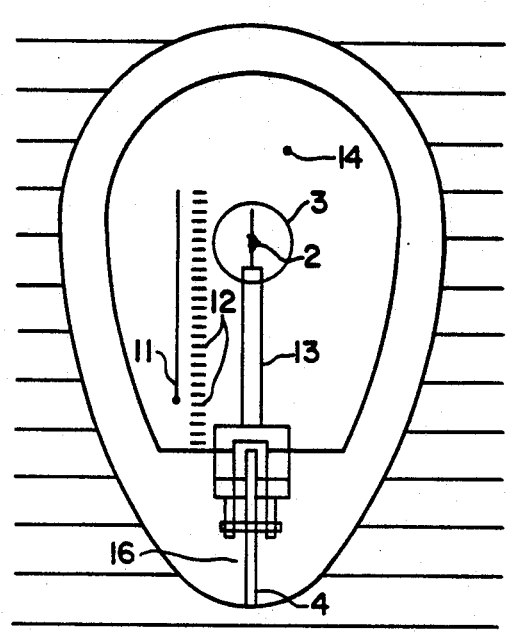
FIG. 2 is a sectional view along II—II in FIG. 1.
Figure 2A:
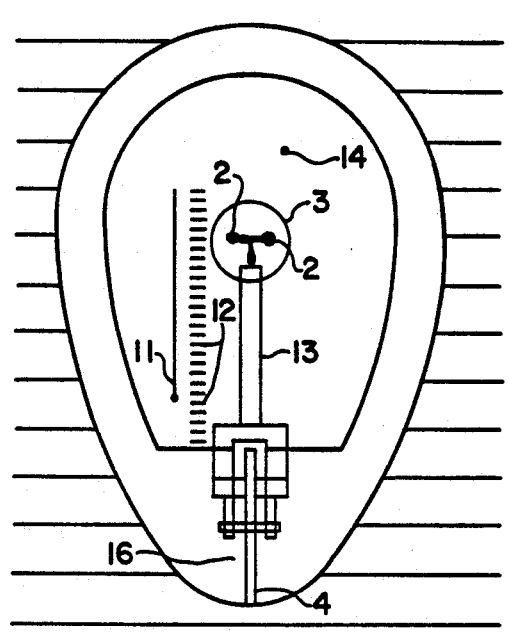
FIG. 2a shows another embodiment of the present invention taken along line II—II in FIG. 1.
Figure 3:
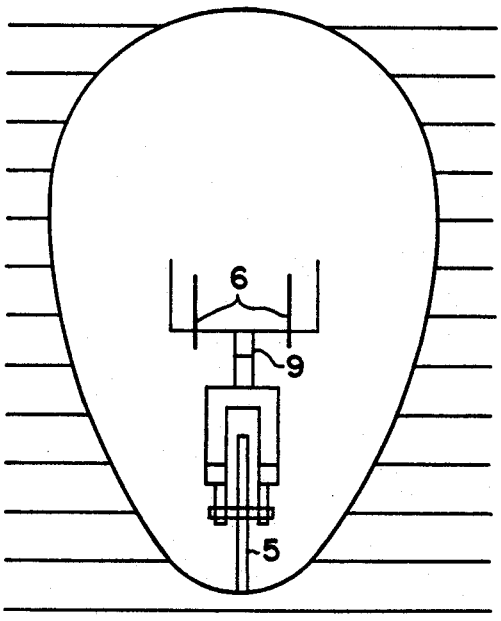
FIG. 3 is a sectional view along line III—III in FIG. 1.
Figure 4:
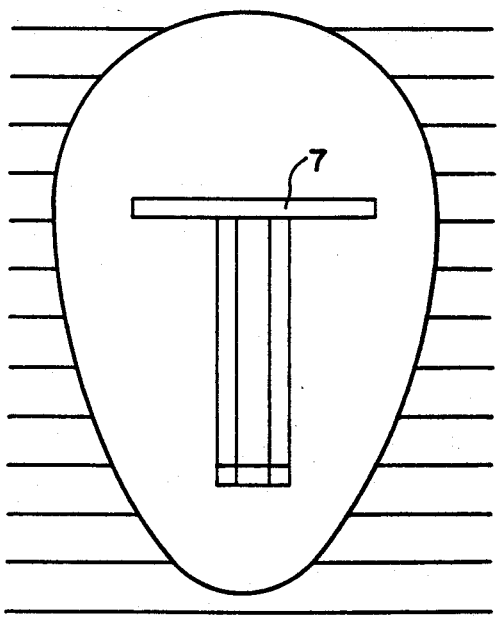
FIG. 4 is a sectional view along line IV—IV in FIG. 1.

Plate 1 also has an opening 3, preferably in its center, in which a lamp 2 is arranged in such a way that the plane of one surface of the plate is equal to the plane of the light-shadow transition and half-shade is thus minimized. This is obtained, for example, by having the helix of the lamp 2 situated precisely in the plane of the plate. The lamp is screened in lightproof manner toward the other plane of the plate, the one facing away from the camera. In this way, the tunnel to be measured is divided into light and dark parts, with the dividing line sharply delimited and located in one plane with the light source. The light plane generated in this way forms the profile plane of interest to the measuring process. Of course it is also possible, particularly for large tunnels, to use several light sources 2 that are arranged in openings 3 distributed over the plate 1 (see FIG. 2a).

Figure 5:
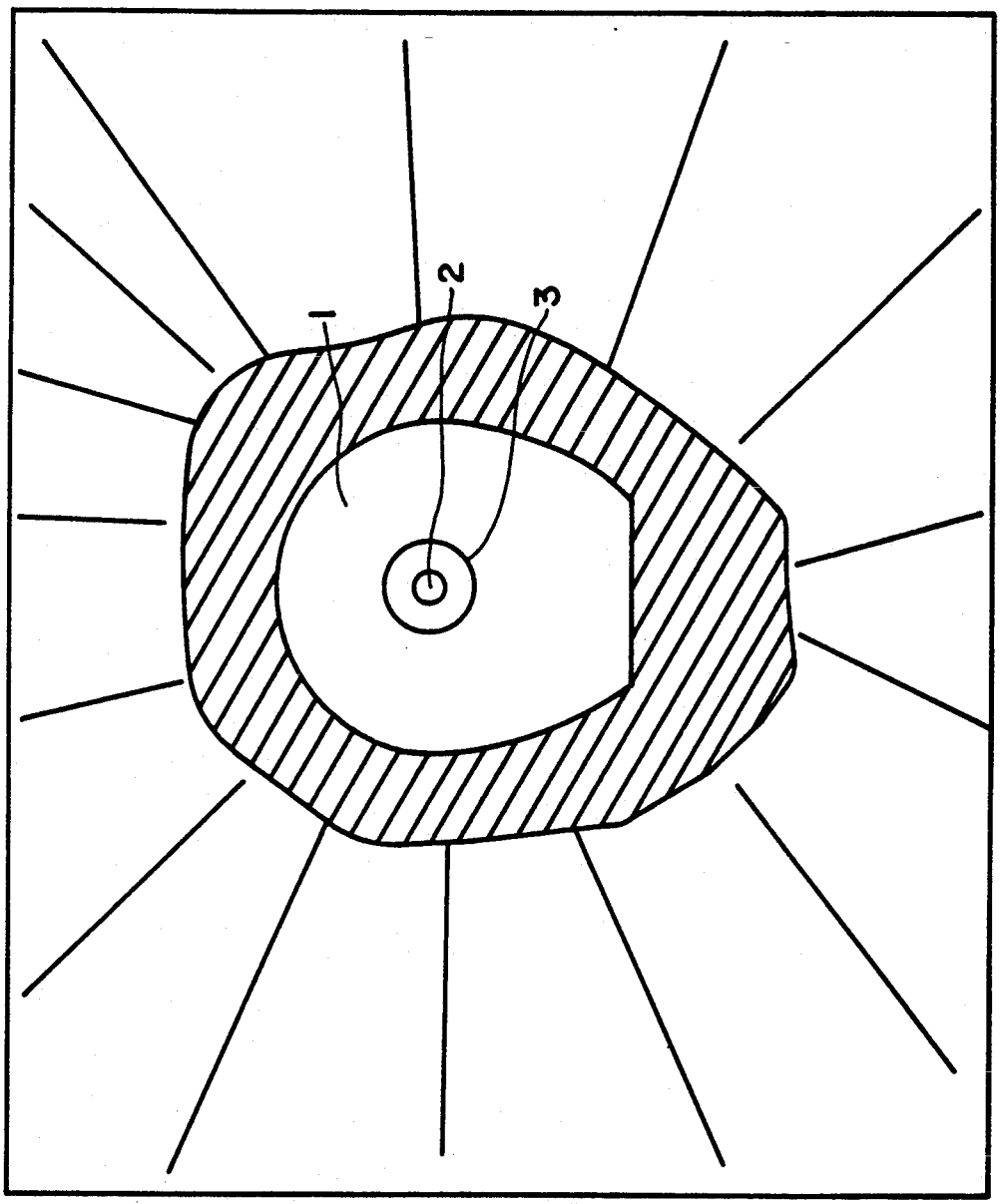
FIG. 5 shows a video image of the tunnel to be measured.

In the process, the video image (FIG. 5), as seen from the center outward, shows the plate 1 generating the measuring plane, with the lamp 2 and the opening 3, a dark area characterizes the tunnel behind the plane, and the front light part of the tunnel is shown surrounding the dark area.

When the plate 1 is connected firmly with the light source 2 and the video camera (6) is connected to the cart, the distance between measuring plane and camera remains constant for the duration of the measuring process. With the image plane and the measuring plane parallel, the image is guaranteed to be at a constant scale. The cart is then run along the tunnel. Preferably, its speed should not exceed 25 cm/sec. The camera takes a picture of one profile per second at this speed. Digital video images can be played into a PC and processed directly. This guarantees an uninterrupted data flow.

As a result of the digital recording, any individual profiles can be selected by stopping the video tape. The profiles can also be subsequently evaluated outside the tunnel with no new measuring procedure needed. The individual profile planes ascertained must then be combined and transformed into a higher-ranking system, since a complete, accurate, three-dimensional image of the measured hollow space is only produced when the individual profiles are strung together properly.

A reference ray emitted by a laser is used to establish the respective position of the profile plane in the space. The reference ray forms a reference point 14 on the plate 1, which is then recorded by the video camera. In addition, it is necessary to arrange a plumb bob, preferably an electronic one, in the profile plane. A theodolite is arranged in the conduit, for example beneath a manhole, to determine the cartesian coordinates of the reference point 14. The coordinates x,y of this theodolite are plotted from the street from the vertical manhole, i.e., the manhole cover is located in the official coordinates system. The depth of the theodolite arranged in this manner is determined from the manhole cover using a tapeline. A plumb bob is then also arranged from a second vertical manhole that has underground visual contact with the arranged theodolite, and the plumb bob and theodolite are measured in relation to each other. As the coordinates of the theodolite and those of the second plumb bob are known, a defined horizontal direction in relation to the official plane coordinates system is obtained. The vertical direction with respect to the plumb lines is known. The directions measured in this manner should no longer be changed for the duration of the measuring process. The laser 17 needed to generate the reference ray as well as a device for measuring the distance covered by the profile plane are arranged on the theodolite. The reference ray represents the measured direction between the theodolite and the second plumb bob. The distance is always measured parallel to the laser ray using a device for measuring distance covered, which does not require a reflector at the goal.

The plate 1 can be made of transparent, translucent or even opaque plastic. If it is made of transparent or translucent material, it must be situated between the theodolite (and thus the laser source) and the camera. However, if it is made of opaque material, the camera must be situated between the laser source and the plate. These different arrangements are significant because the reference ray be levelled at the plate for the duration of the measuring procedure in order to constantly generate the reference point needed to plot the position of the profile plane. This red point projected by the laser onto the plate must be constantly visible on the side of the plate assigned to the camera. When the distance from the theodolite to the plate is known, the reference point will have official coordinates.

A gauge should be applied on the front wheel 4 of the cart, for example, to measure distance. But there can also be a counting device, an electronic counting device, for example, connected with the front wheel by gearwheels. This counting device is also filmed while pictures are being taken. The car is stopped at predetermined intervals, preferably every 2 meters, and the distance is measured precisely in order to determine the distance between the theodolite (and thus the laser source) and the plate more accurately. The change in the projected reference point in relation to the longitudinal axis of the cart is measured directly on the video image to further determine the position of the profile plane. The dimensions of the cart must also be measured, whereby the vertical distance, as determined directionally by the plumb bob, from the reference point to the point of support of the front wheel on the ground below is established. This also takes place on the video image.

Figure 1:
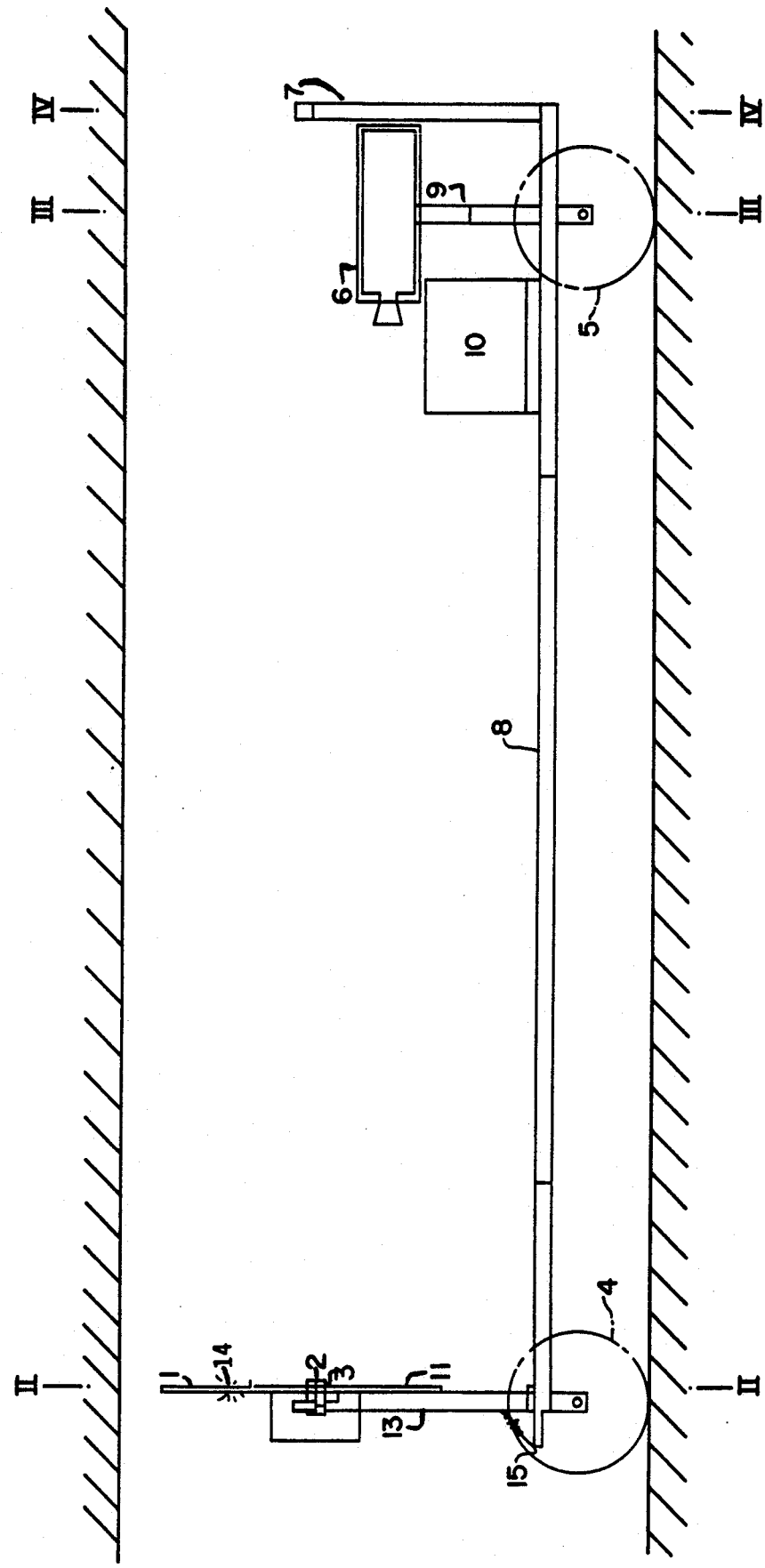
FIG. 1 is a side view of the device according to the principles of the invention shown positioned within a tunnel.

The cart illustrated in FIG. 1 is a single-track version because of the particular cross-sectional shape of the conduit to be measured. It comprises a rods structure 8 firmly joining the video camera 6 with the plate 1. On this rods structure, the plate 1 is disposed together with the light source 2 via a support 13. The plastic plate also comprises a plumb bob 11 and a gauge 12 added onto the plumb bob. The axis of the front wheel 4 is arranged directly beneath the plate 1. A battery 10 is assigned to the video camera firmly connected with the cart by a holder 9. Another rods structure 7 is at the end of the cart, so that the cart can be pushed by hand if necessary. If, for example, work is being done in tunnels where projections from the tunnel wall can be expected, the support carrying the plate 1 can be connected via a folding mechanism to the cart's bearing surface (a rods structure), so that the plate 1 can be swung away. The video camera must be arranged in such a way that it can detect the entire light-shadow profile generated as well as the following devices: the plate 1 with reference point 14 it is projecting; the gauge 12 for determining the scale of the image on the plate 1; and the front wheel 4 with the gauge 16 to measure the distance between the stops of the cart, which are preferably made every 2 m.

For the sake of simplicity the axis of the front wheel 4 should be situated in the profile plane, as was already mentioned. In this way, the point of contact of the front wheel with the conduit bottom, which is also situated in the profile plane, can be determined in relation to the reference point 14 quite easily on the monitor of a PC.

To determine the direction of the moving cart, it is initially assumed that the profile plane P is situated normally in relation to the direction of the reference ray R. Assuming this, a temporary axial point (point of contact of the front wheel with the conduit bottom) is calculated. This approximately calculated axial point is so imprecise that a maximum error $F_{max}$ occurs and then normally a minimum error $F_{min}$ in the direction of the axis of the conduit A. The actual position of the profile plane is characterized by P' (see FIG. 6). If the cart is then pushed further until the rear wheel 5 is situated at the point where the front wheel 4 was at first, another measurement can be made for the front wheel and subsequently the direction of the longitudinal axis of the cart can be calculated precisely. Precise determination of the direction results from the fact that, as mentioned above, the imprecision of the temporary points on the path toward the reference ray reaches a maximum and then normally a minimum. By the arrangement of the camera and the plate to each other, the perpendicular line of the profile plane P corresponds to the optical axis of the camera, which in turn is congruent with the longitudinal axis of the cart.

To be able to calculate the precise position of the rear wheel 5 it must be guaranteed that the rear wheel runs approximately in the path of the front wheel and thus covers the same distance. This is guaranteed with conduits with an egg-shaped section and with very narrow bottom. If the rear wheel deviates from the track of the front wheel by $+-5$ cm, for example, this produces an error in the coordinates of a point on the tunnel wall of about 1 cm in the direction of the reference ray. For larger tunnel cross-sections, the cart must run either straight forward or in curves with equal radiuses. In the latter case, the tractrix of the rear wheel can be calculated. When evaluating the recording, the relative distance covered between the stopping points, as measured on the front wheel, cannot be traced directly on the laser ray since the path is generally curved. The position of the front wheel along a curved path is determined using an iterative process in which the precision of the coordinates of the reference point 14 is improved with the number of determined points on the path. If the cart moves in a straight line, this iterative process can be dropped since the cart's axial direction is always the same and is already known after 2 measurements.

To calculate the required parameters, first the axis of the conduit is determined at the stopping points. On the video image, the first profile that is also situated in the stopping point is taken. The precise distance between theodolite and plate was determined at this stopping point. The profile is taken standing in normal position in relation to the reference ray and a temporary axial point is calculated. This procedure is carried out over several stopping points. If the interval between the stepping points is the same as the distance between the axes of the cart, then the position of the rear wheel at the next stopping point is already known with relative precision.

Using the coordinates of the reference point and the determined position of the wheels, a relatively accurate axis A of the conduit can be determined. This axis consists of an approximated axial point of the first stopping point and the precise stopping point of the second stopping point. A new, precise axial point is calculated at every other stopping point. The reason why the second axial point and every other one are precise is that, as a result of the minimum errors, the direction of the cart in the space to the axis of the conduit normally has very little error, and the maximum error in the direction of the axis A of the conduit is eliminated by the precise position of the stopping point. The axis A of the conduit is actually determined using an iterative process, with the distance measured at the front wheel 4 on the temporary axis of the conduit, while a temporary cart direction and a temporary axial point are determined with the position of the rear wheel 5. With this determined axial point, the axis of the conduit is improved. The calculation is then repeated. The distances in the profile plane are measured with a CAD program and the precise data of the position of the profile plane P are calculated with a program. With this data, the profile is then digitalized directly on the monitor.

What is claimed is:

1. Procedure for measuring cross-sections of a hollow space, comprising the steps of:
    generating a light plane within the hollow space, wherein the light plane defines a profile plane, and radiates coplanar to a surface;
    recording a reflection of the light plane off walls of the hollow space with a camera directed at the light plane and attained stationary in relation to the light plane, the light plane illuminating the hollow space in a direction extending from the profile plane towards the camera;
    determining the path of progressing measurements using a reference ray to provide a reference point on the surface; and
    measuring the distance of the light plane from a predetermined starting point constantly using a counting device and at preselected intervals using a device for measuring distance covered;
    wherein the recording step includes recording the light plane, the reference point, a plumb bob, and the counting device at the same time using the camera.

2. The cross-section measuring procedure according to claim 1, wherein the surface includes a vertical marking thereon which also is recorded by the camera during the recording step.

3. The cross-section measuring procedure according to claim 1, wherein the recording step further comprises moving the light plane along a longitudinal axis of the hollow space to be measured.

4. The cross-section measuring procedure according to claim 1 wherein the recording step further comprises interrupting a displacement of the light plane at various time intervals and measuring a position of the light plane in relation to the predetermined starting point.

5. The cross-section measuring procedure according to claim 1, wherein the reference ray comprises a laser ray generated by a laser.

6. The cross-section measuring procedure according to claim 1, wherein the predetermined starting point corresponds to a source of the reference ray.

7. A device for measuring the cross-section of a hollow space, comprising:
    at least one plate having at least one opening therein and including a plumb bob thereon;
    a light source directed at the plate and disposed within the at least one opening;
    a camera directed at the plate;
    the at least one plate, the light source, and the camera being arranged on a cart that is movable in an axial direction of the hollow space, the cart comprising a bearing surface and at lest one front wheel and one rear wheel and including a device for measuring distance arranged thereon proximate to the plate; and
    another light source arranged in the hollow space to generate a reference ray aimed at the plate.

8. A device according to claim 7, wherein a helix of the light source is arranged in the plane of a surface of the plate.

9. A device according to claim 7, wherein the bearing surface comprises a rod structure that firmly connects the camera and the plate.

10. A device according to claim 7, wherein the plum bob is an electronic plum bob.

11. A device according to claim 7, further comprising a gauge arranged on the side of the plate facing the camera.

12. A device according to claim 7, wherein the plate is made of transparent or translucent material.

13. A device according to claim 7, wherein several light sources directed at the camera are arranged in the plate.

14. A device according to claim 5, wherein the device for measuring distance covered is a counting device arranged on the at least one front wheel of the cart.

15. A device according to claim 7, wherein the cart has a separate counter wheel.

16. A device according to claim 7, wherein the plate is arranged on the cart in a tiltable manner by means of a tiling device.

17. A device according to claim 7, wherein the another light source comprises a laser and the camera is a video camera.

* * * * *